Oct. 29, 1929.  J. E. KALGREN  1,733,374
BOLT CUTTER
Filed Oct. 25, 1926
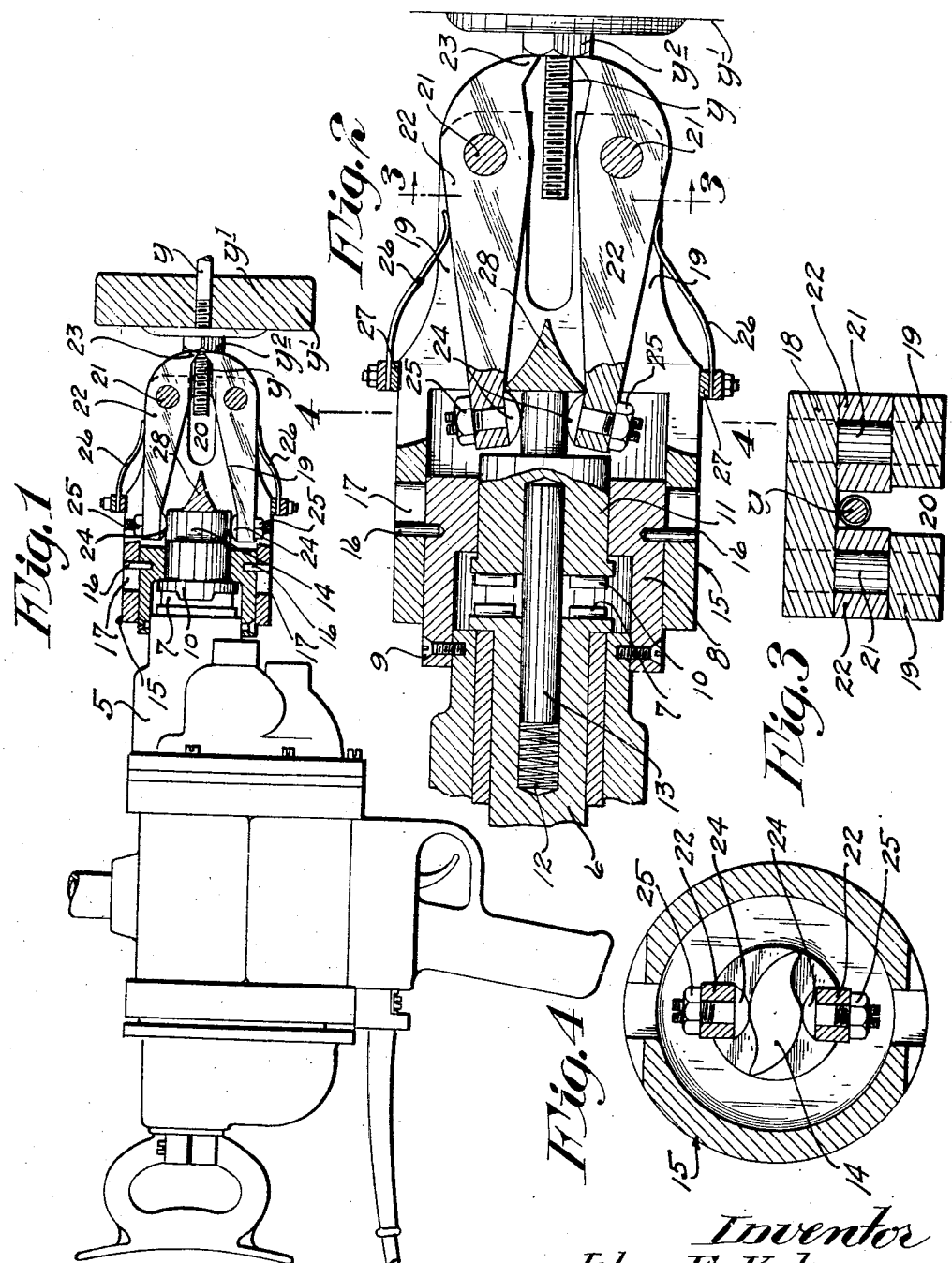
Inventor
John E. Kalgren
By his Attorneys
Michaust Kilgore Patented Oct. 29, 1929

1,733,374

UNITED STATES PATENT OFFICE

JOHN E. KALGREN, OF MINNEAPOLIS, MINNESOTA

BOLT CUTTER

Application filed October 25, 1926. Serial No. 143,924.

My present invention provides an extremely simple and highly efficient bolt cutter, the term "bolt cutter" being used in a broad and liberal sense to include devices for cutting off not only bolts but rivets, wires and the like. Generally stated, the invention consists of the novel devices, combinations of devices and arrangement of parts hereinafter described and defined in the claims.

The device is especially designed for use as a portable bolt cutter, this is, a device adapted to be carried in the hand and to be successfully operated at various different points and without requiring the work to be brought thereto. The device comprises a suitable casing, housing or support for the portable bolt cutter proper, and mounted within or on such casing or support, bolt-cutting jaws, driving and driven clutch members, and novel means whereby the clutch members may be engaged and the cutting jaws operated. The driving clutch member is adapted to be continuously driven, that is, maintained under rotation, by any suitable or well known means, such as an electric motor, a pneumatically operated rotor or a flexible shaft, for example, but preferably an electric motor applied in or on the portable casing will be used.

In the accompanying drawings, which illustrate the invention, the bolt cutter is shown as applied to a motor-driven tool well known to the trade and having a piston grip and trigger switch, but it will be understood that this particular adaptation is illustrative and in no wise limited to such commercial tool.

Referring to the drawings, wherein like characters indicate like parts throughout the several views, Fig. 1 is a view partly in plan and partly in horizontal section, showing the bolt cutter applied to the tool and illustrating the bolt-cutting action;

Fig. 2 is a fragmentary horizontal axial section corresponding in the line of its section substantially to Fig. 1, showing on an enlarged scale the bolt-cutting attachment or device and a portion of the electric tool;

Fig. 3 is a section on the line 3—3 of Fig. 2; and

Fig. 4 is a section on the line 4—4 of Fig. 2.

Of the parts of the electric tool, it is only desirable for the purposes of this case to particularly note the casing 5 within which is mounted a rotary shaft 6 provided at its outer end with a half-clutch 7. This shaft 6, in the tool described, is driven by an electric motor, not shown but contained within the casing 5. Secured to and projecting from the barrel-like front end of the casing 5 is a large sleeve 8 shown as detachably secured thereto by screws 9. For cooperation with the half-clutch 7 is a similar half-clutch 10 carried by the inner end of a stub shaft 11 mounted in the sleeve 8 for rotary and for limited axial movements. This stub shaft 11 is in axial alignment with the shaft 6 and it is yieldingly pressed outward to normally maintain the half-clutch 10 disengaged from the half-clutch 7 by a yielding device, which, in this particular instance, includes a coiled spring 12 and a thrust pin 13. The spring 12 is axially seated in the shaft 6 and the thrust pin 13 is seated in the stub shaft 11 and is axially movable in the shaft 6. At its outer end, the stub shaft 11 is provided with a flattened cam 14.

Mounted for sliding movements on the sleeve 8 is a supplemental casing 15 that is held against rotation in respect to the sleeve 8 and casing 5 by radial pins 16 applied to said sleeve and working in longitudinal slots 17 in said supplemental casing. The supplemental casing 15 is provided with forwardly projecting parallel upper and lower plates 18 and 19, respectively, the latter having a longitudinal slot 20 extending to its extreme forward edge.

Located between the plates 18 and 19 and pivotally connected thereto by pivot pins 21 is a pair of cooperating cutting jaws 22, as shown and preferably in the form of levers of the "first class". At their projected front ends, the jaws 22 are provided with opposed cutting blades 23 and at their relatively long rearwardly extended ends they are subject to the cam 14 on the stub shaft 11. Preferably and as shown, instead of making the cam 14 directly active on the integral portions of the jaws 22, the latter are provided with adjustable cam-engaging portions formed by the rounded heads of bolts 24 that work with screw-threaded engagement through the rear ends of said jaws and are adapted to be locked thereto in different adjustments by lock nuts 25. Obviously, by adjustments of the bolts 24, the cam 14 can be caused to bring the edges of the jaw blades 23 just together under extreme closing movements and, moreover, said bolts can be adjusted to compensate for wear and repeated sharpening of the jaw blades. The jaws 22 are normally held in open positions, that is, with their blades 23 separated, by yielding means preferably in the form of leaf springs 26 anchored at their inner ends to small cross bars 27 secured on the supplemental casing 15. At its central portion, between the bases of the upper and lower plates 18 and 19, the supplemental casing 15 is formed with a web 28, the flat inner face of which engages frictionally against the front face of the cam 14 and limits the forward movement of said cam and the stub shaft 11. This web 28 acts as an abutment which, when the supplemental casing 15 is pressed rearward, moves the idle clutch 10 into engagement with the driven or constantly running clutch 7. In Figs. 1 and 2, the character $y$ indicates a bolt applied to a pin $y^1$ or the like.

The normal position of the jaws and of the cam 14 and of the stub shaft 11 and clutch members 7 and 10 is illustrated in Fig. 2. In this condition of the parts, as is evident, the device may be positioned to cut the bolt $y$, for example, simply by placing the jaw blades 23 on opposite sides of the bolt at the place where the bolt is to be cut off. If the bolt has a long projecting end to be cut off, the device can be positioned by a downward movement, causing the bolt to pass through the slot 20 and against the upper plate 18, and then when the end of the bolt is cut off, it will drop freely through the said slot 20.

The shaft 6, by means of a trigger or other motor-controlling device, may of course be thrown into and out of action, at will, but throughout a period of operation, it may be assumed to be under continuous rotation. All that is required to operate the cutting jaws is to press the front ends of the jaws against a nut $y^2$ and thereby force the stub shaft 11 axially rearward so as to engage the half-clutch 10 with the constantly running half-clutch 7, and when this is done, the first half rotation of the cam 14 will cause the jaws to cut off the bolt. Of course, if the axial pressure is kept on the jaws, the cutting action will be rapidly repeated, but one expert in the use of the tool will, by a sudden and quickly released pressure, be able to cut a bolt by a single jaw movement. Of course, no damage could be done by repeated or unnecessary additional jaw movement. When the endwise pressure is released on the jaws, the spring 12 will release the clutch members and stop the rotation of the stub shaft 11 and cam 14, and when the said cam is released, the spring 26, acting through the jaws, will cause the cam 14 to assume its normal or intermediate position shown in Fig. 4 and in which position said cam permits the jaws to assume and maintain their open positions.

In instances where the cutting action cannot conveniently be produced by pressing the ends of the jaws against a bolt or the like to shift the clutch members into engagement, such engagement of the clutch members may be accomplished simply by placing a hand on the supplemental casing 15 and moving the same rearward so as to engage the clutch members. In either instance, it is a rearward movement of the supplemental case section in respect to the main case that engages the clutch members and causes the jaws to be operated to cut off the bolt or the like. By reference particularly to Figs. 2 and 4, it will be noted that, normally or when the device is idle, the springs 26 hold the cutting jaws 23 separated or open and cause the bolt heads or elements 24 to press the cam 14 and hold the latter in an inoperative position, that is, with its major diameter substantially at a right angle to the aligned axes of the said heads 24.

As is evident, this so-called bolt cutter may be used to cut off rivets, wires, small rods and the like. In actual practice, it has been found quick and reliable in action and very highly efficient. It will be understood that in the drawings I have illustrated a commercial device now believed to be the preferred form of the invention, but modifications thereof may be made within the scope of the invention as herein disclosed and broadly claimed.

What I claim is:

1. A portable device of the kind described comprising a casing, a continuously running half-clutch mounted in said casing, a normally idle cooperating half-clutch mounted in said casing for rotary and axial movements, means normally holding said half-clutch members disengaged, a supplemental case section mounted on said casing for limited sliding movements relative thereto, a pair of pivoted cutting jaws mounted on said supplemental casing, a cam connected to said normally idle clutch member for rotary and axial movements therewith, said cam operating on said cutting jaws when rotated, and which clutch members are arranged to be engaged by axial movement of said supplemental casing and the jaws carried thereby.

2. The structure defined in claim 1 in which said cutting jaws are spring-pressed to open positions and normally hold said cam in an inoperative idle position.

3. The structure defined in claim 1 in which said supplemental casing is provided with an abutment operative on said idle clutch member to press the same into engagement with the running clutch member when said supplemental casing is moved rearward.

4. The structure defined in claim 1 in which said supplemental casing is provided with an abutment operative on said idle clutch member to press the same into engagement with the running clutch member when said supplemental casing is moved rearward, the means for holding the clutch members disengaged comprising a spring.

5. A power operated cutting tool comprising, a power spindle support, jaw carrying means mounted on said support, cutting jaws supported by said jaw carrying means, normally inoperative means for actuating said cutting jaws axially movable relative to said spindle support, and means cooperating with said cutting jaws and said last mentioned means arranged to be actuated by pressure on the cutting end of the tool to impart cutting operation to said jaws.

6. A power operated cutting tool comprising, a power spindle support, jaw carrying means mounted on said support for axial movement relative thereto, cutting jaws mounted on said jaw carrying means, normally inoperative means for actuating said cutting jaws, said last mentioned means being axially movable relative to said spindle support by movement of said jaw carrying means for affecting the operation of said cutting jaws.

In testimony whereof I affix my signature.

JOHN E. KALGREN.